US012574209B2

(12) United States Patent
Wang et al.

(10) Patent No.: US 12,574,209 B2
(45) Date of Patent: Mar. 10, 2026

(54) DATA PROTECTION USING PORTABLE DATA STRUCTURES

(71) Applicant: INTERNATIONAL BUSINESS MACHINES CORPORATION, Armonk, NY (US)

(72) Inventors: Heng Wang, Beijing (CN); Ming Zhe Jiang, Beijing (CN); Jun Long Xiang, Beijing (CN); Jian Guo Liu, Beijing (CN); Qi Ye, Shanghai (CN); Xiao Ling Chen, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 347 days.

(21) Appl. No.: 18/067,238

(22) Filed: Dec. 16, 2022

(65) Prior Publication Data

US 2024/0204986 A1 Jun. 20, 2024

(51) Int. Cl.
*H04L 9/06* (2006.01)

(52) U.S. Cl.
CPC .......... *H04L 9/0625* (2013.01); *H04L 9/0637* (2013.01)

(58) Field of Classification Search
CPC ............................ H04L 9/0625; H04L 9/0637
(Continued)

(56) References Cited

U.S. PATENT DOCUMENTS 8,533,474 B2 * 9/2013 Schneider ............. H04L 9/3242
713/168
9,450,923 B2 9/2016 Klum et al.
(Continued)

FOREIGN PATENT DOCUMENTS

CN 101478733 A * 7/2009
CN 103649907 A * 3/2014 .......... G06F 9/4843
(Continued)

OTHER PUBLICATIONS

Ehrsam, Block Chaining Using Plaintext Ciphertext Feedback, IP.com Disclosure No. IPCOM000067312D, IBM Technical Disclosure Bulletin (TDB 07-79 p. 650-651), 3 pages, Jul. 1979. (Year: 1979).*

(Continued)

*Primary Examiner* — Kari L Schmidt
*Assistant Examiner* — Walter J Malinowski
(74) *Attorney, Agent, or Firm* — Aaron Pontikos, Esq.; Matthew M. Hulihan, Esq.; Heslin Rothenberg Farley & Mesiti P.C.

(57) ABSTRACT

Data protection using portable data structures includes packaging ciphertext blocks into portable data structures, the ciphertext blocks being produced based on encryption of plaintext blocks according to a block encryption mode that includes dependencies between cryptographic processing of the plaintext blocks, the dependencies including decryption of a first ciphertext block being dependent on a second ciphertext block or decryption processing of the second ciphertext block, the packaging including providing, for each ciphertext block that has a dependency on another ciphertext block, an associated dependency label in the portable data structure in which the ciphertext block is packaged, and distributing the portable data structures to nodes such that portable data structures, of the portable data structures, that package ciphertext blocks between which at least one dependency exists are distributed to different nodes of the nodes.

20 Claims, 11 Drawing Sheets

(58) Field of Classification Search
USPC ............................................................ 713/168
See application file for complete search history.

(56) References Cited

U.S. PATENT DOCUMENTS

| | | | |
|---|---|---|---|
| 10,185,722 B2 | 1/2019 | Bowman et al. | |
| 11,074,265 B2 * | 7/2021 | Baskinger | G06F 16/24553 |
| 2002/0048364 A1 * | 4/2002 | Gligor | H04L 9/0643 380/37 |
| 2006/0050889 A1 * | 3/2006 | Lee | H04L 9/0637 380/286 |
| 2006/0282665 A1 * | 12/2006 | Zhu | H04N 7/1675 713/160 |
| 2007/0156713 A1 * | 7/2007 | Xu | G06Q 30/06 |
| 2010/0027783 A1 * | 2/2010 | Yup | H04L 9/0643 380/44 |
| 2012/0291045 A1 * | 11/2012 | Martin | G06F 9/4494 718/106 |
| 2014/0075183 A1 * | 3/2014 | Wang | G16B 30/00 713/150 |
| 2015/0172255 A1 * | 6/2015 | Warnez | H04L 9/32 713/168 |
| 2017/0048021 A1 | 2/2017 | Yanovsky et al. | |
| 2019/0013936 A1 * | 1/2019 | Murray | H04L 9/088 |
| 2019/0050856 A1 * | 2/2019 | Vintila | H04L 9/3239 |
| 2020/0259633 A1 * | 8/2020 | Gallagher-Lynch | H04L 9/3297 |
| 2020/0272618 A1 * | 8/2020 | Hughes | H04L 9/3236 |
| 2021/0067339 A1 * | 3/2021 | Schiatti | G06F 16/27 |
| 2021/0119766 A1 * | 4/2021 | Suresh | G09C 1/00 |
| 2021/0311926 A1 * | 10/2021 | Ponceleon | G06F 21/12 |
| 2023/0252012 A1 * | 8/2023 | Lee | G06F 11/3409 707/713 |
| 2024/0338682 A1 * | 10/2024 | Anton | H04L 9/50 |

FOREIGN PATENT DOCUMENTS

| | | | | | |
|---|---|---|---|---|---|
| CN | 105681031 A | * | 6/2016 | | |
| CN | 110704858 A | * | 1/2020 | ......... | G06F 21/6218 |
| CN | 112019338 A | * | 12/2020 | ........... | H04L 63/123 |
| CN | 113032357 A | * | 6/2021 | ........ | G06F 21/6218 |
| EP | 0012974 B1 | * | 10/2007 | | |
| WO | WO-2007118034 A2 | * | 10/2007 | ............. | G06F 11/07 |
| WO | 2017153833 A1 | | 9/2017 | | |

OTHER PUBLICATIONS

Lin, Yi-Nan, and Kuo-Tsang Huang. "Shell-Based Block Ciphering Structure (SBCS) for AES Parallelism with Feedback-Data Mode." In 2014 International Conference on Cyber-Enabled Distributed Computing and Knowledge Discovery, pp. 48-55. IEEE, 2014. (Year: 2014).*

Kapusta. "Enhancing data protection in a distributed storage environment using structure-wise fragmentation and dispersal of encrypted data." In 2018 17th IEEE International Conference On Trust, Security And Privacy In Computing . . . , pp. 385-390. IEEE, 2018. (Year: 2018).*

Nivetha, F., et al., "An Efficient Cloud Security System Using Verifiable Decryption Process", 2016 IJARMATE, pp. 224-228 <https://www.researchgate.net/publication/328216189_An_efficient_cloud_security_system_using_verifiable_decryption_process>.

Memmi, G., et al., "Data Protection: Combining Fragmentation, Encryption, and Dispersion", Telecom ParisTech | ITEA2-CAP WP3 Final Report, Nov. 2016, 79 pgs. <https://arxiv.org/ftp/arxiv/papers/1512/1512.02951.pdf>.

* cited by examiner

DATA PROTECTION USING PORTABLE DATA STRUCTURES

BACKGROUND

Symmetric-key algorithms are algorithms for cryptography that use the same cryptographic key for both the encryption of plaintext and the decryption of ciphertext. Encryption/decryption often proceeds according to a defined encryption mode of operation. Various types of encryptions modes exist, one being the block encryption mode type in which a plaintext message is broken into blocks and the encryption occurs on each block to produce encrypted blocks. The block encryption mode of operation therefore describes how to repeatedly apply a cipher's single-block operation to securely transform amounts of data larger than a block. Often the decryption procedure proceeds by decrypting the encrypted blocks to obtain plaintext blocks that are then joined to arrive at the original plaintext message. Cloud data encryption exists that leverages a dedicated cloud hardware security module for protection and enables multi-cloud key management, for instance.

SUMMARY

Shortcomings of the prior art are overcome and additional advantages are provided through the provision of a computer-implemented method. The method packages a collection of ciphertext blocks into a collection of portable data structures. The collection of ciphertext blocks are produced based on encryption of a collection of plaintext blocks according to a block encryption mode that includes dependencies between cryptographic processing of the collection of plaintext blocks. The dependencies include decryption of a first ciphertext block of the collection of ciphertext blocks being dependent on a second ciphertext block of the collection of ciphertext blocks or decryption processing of the second ciphertext block. The packaging includes including, for each ciphertext block, of the collection of ciphertext blocks, having a dependency on another ciphertext block, an associated dependency label in the portable data structure in which the ciphertext block is packaged. The dependency label indicates the another ciphertext block. The method also includes distributing the collection of portable data structures to a collection of nodes such that portable data structures, of the collection of portable data structures, that package ciphertext blocks between which at least one dependency exists are distributed to different nodes of the collection of nodes.

Further, a computer system is provided that includes a memory and a processor in communication with the memory, wherein the computer system is configured to perform a method. The method packages a collection of ciphertext blocks into a collection of portable data structures. The collection of ciphertext blocks are produced based on encryption of a collection of plaintext blocks according to a block encryption mode that includes dependencies between cryptographic processing of the collection of plaintext blocks. The dependencies include decryption of a first ciphertext block of the collection of ciphertext blocks being dependent on a second ciphertext block of the collection of ciphertext blocks or decryption processing of the second ciphertext block. The packaging includes including, for each ciphertext block, of the collection of ciphertext blocks, having a dependency on another ciphertext block, an associated dependency label in the portable data structure in which the ciphertext block is packaged. The dependency label indicates the another ciphertext block. The method also includes distributing the collection of portable data structures to a collection of nodes such that portable data structures, of the collection of portable data structures, that package ciphertext blocks between which at least one dependency exists are distributed to different nodes of the collection of nodes.

Yet further, a computer program product including a computer readable storage medium readable by a processing circuit and storing instructions for execution by the processing circuit is provided for performing a method. The method packages a collection of ciphertext blocks into a collection of portable data structures. The collection of ciphertext blocks are produced based on encryption of a collection of plaintext blocks according to a block encryption mode that includes dependencies between cryptographic processing of the collection of plaintext blocks. The dependencies include decryption of a first ciphertext block of the collection of ciphertext blocks being dependent on a second ciphertext block of the collection of ciphertext blocks or decryption processing of the second ciphertext block. The packaging includes including, for each ciphertext block, of the collection of ciphertext blocks, having a dependency on another ciphertext block, an associated dependency label in the portable data structure in which the ciphertext block is packaged. The dependency label indicates the another ciphertext block. The method also includes distributing the collection of portable data structures to a collection of nodes such that portable data structures, of the collection of portable data structures, that package ciphertext blocks between which at least one dependency exists are distributed to different nodes of the collection of nodes Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the disclosure are apparent from the following detailed description taken in conjunction with the accompanying drawings in which:

DETAILED DESCRIPTION

Figure 1:
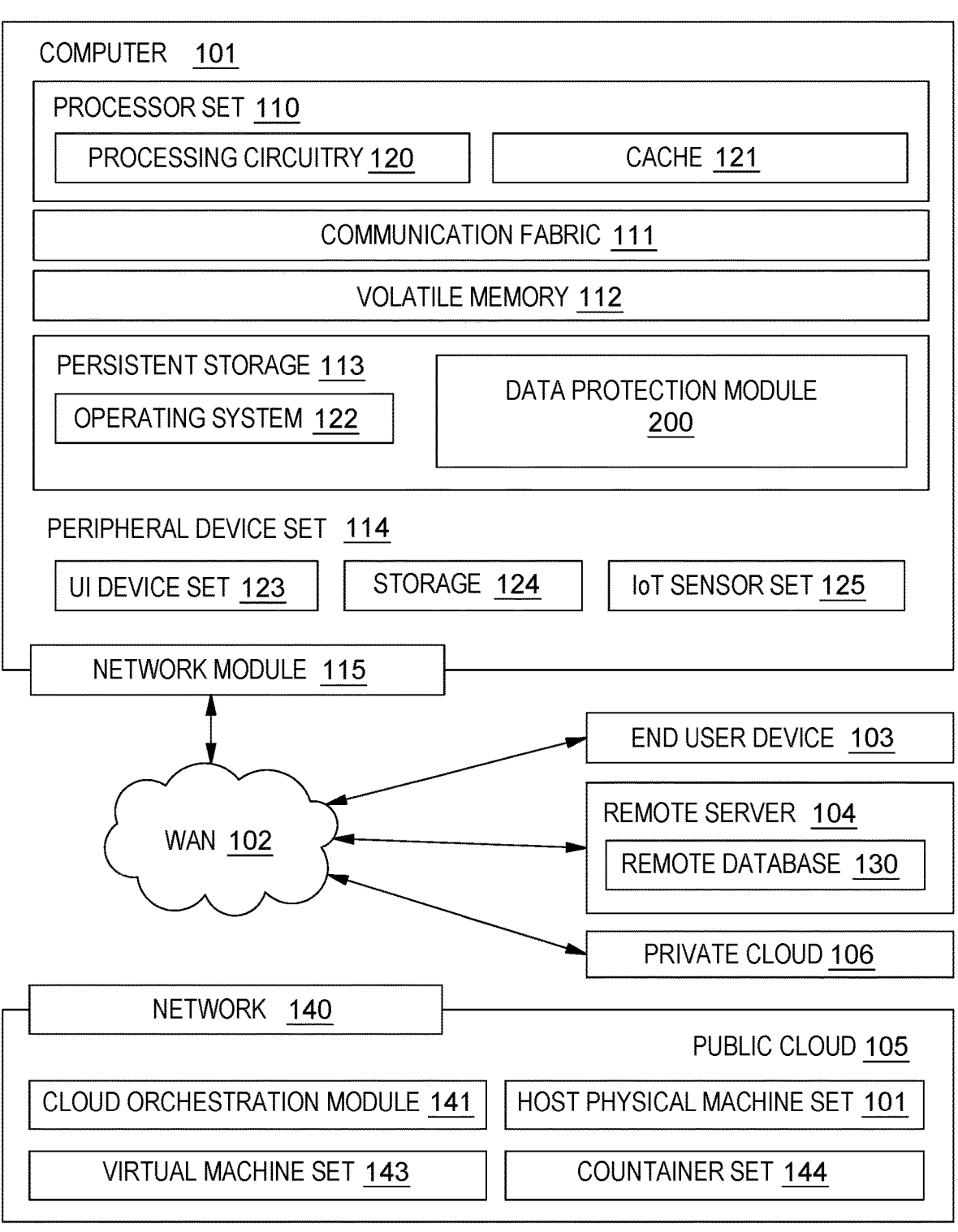
FIG. 1 depicts an example computing environment to incorporate and/or use aspects described herein.

One or more embodiments described herein may be incorporated in, performed by and/or used by a computing environment, such as computing environment 100 of FIG. 1. As examples, a computing environment may be of various architecture(s) and of various type(s), including, but not limited to: personal computing, client-server, distributed, virtual, emulated, partitioned, non-partitioned, cloud-based, quantum, grid, time-sharing, cluster, peer-to-peer, mobile, having one node or multiple nodes, having one processor or multiple processors, and/or any other type of environment and/or configuration, etc. that is capable of executing process(es) that perform any combination of one or more aspects described herein. Therefore, aspects described and claimed herein are not limited to a particular architecture or environment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as code of data protection module 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The computing environment described above in FIG. 1 is only one example of a computing environment to incorporate, perform, and/or use aspect(s) of the present invention. Other examples are possible. For instance, in one or more embodiments, one or more of the components/modules of FIG. 1 are not included in the computing environment and/or are not used for one or more aspects of the present invention. Further, in one or more embodiments, additional and/or other components/modules may be used. Other variations are possible.

Figure 2:
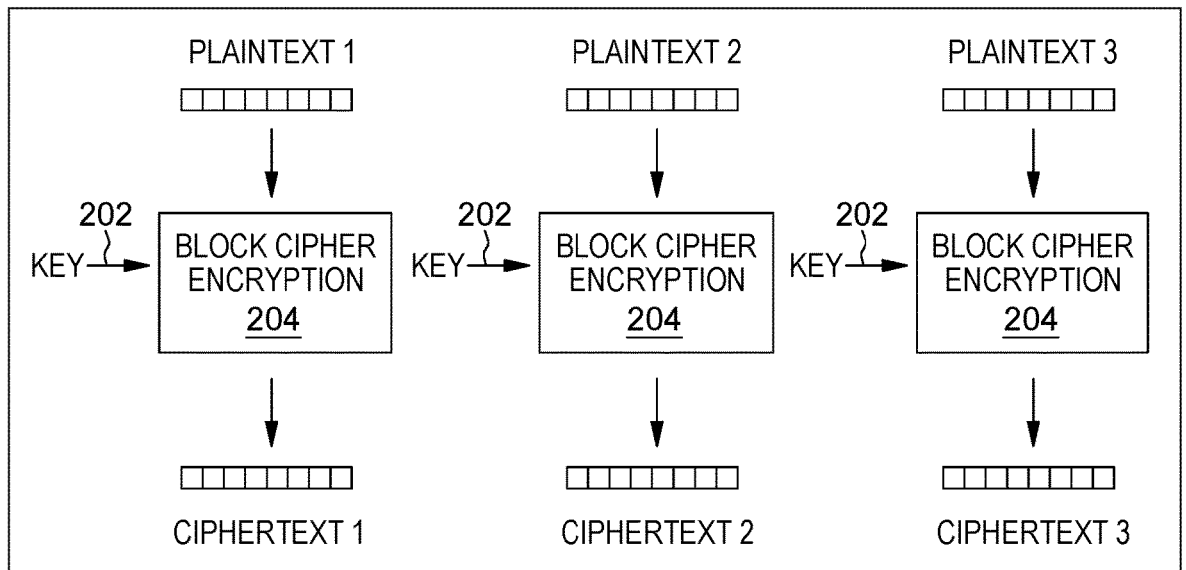
FIG. 2 depicts an example of the electronic code book (ECB) encryption mode.

As noted, various types of encryption modes exist, one being the block encryption mode type. The Electronic Code Book (ECB) mode is an example such block encryption mode, and is one of the simplest. Under this mode, an initial message is divided into blocks, and each such block is encrypted separately. Referring to FIG. 2, depicting an example of the ECB encryption mode, an input plaintext message (not shown) is divided into blocks of plaintext (Plaintext 1, Plaintext 2, and Plaintext 3). As an example, the input plaintext message is a string of alphanumeric data values and is divided into roughly three equal-length segments to form the three plaintext blocks. Secret key 202 is provided to block cipher encryption processing 204 to encrypt each plaintext block Plaintext 1, Plaintext 2, and Plaintext 3 according to the block encryption mode and produce encrypted blocks (also referred to herein as "ciphertext blocks") Ciphertext 1, Ciphertext 2, and Ciphertext 3, respectively. The three plaintext blocks are individually encrypted to produce the three ciphertext blocks of encrypted data. The ciphertext blocks can be passed along untrusted channels, networks, entities, or the like, and are theoretically secure, provided proper security and secrecy is maintained over the secret key. Often the ciphertext blocks are combined/concatenated to produce an encrypted message for passing.

In the ECB of FIG. 2, there is no dependency between encryption/decryption of different blocks; if any given plaintext block (or encrypted block) were missing, this would not affect the ability to encrypt (or decrypt) any of the other plaintext blocks (or encrypted blocks).

Other block encryption modes include dependencies as between the processing of blocks. In these examples, dependencies exist between the cryptographic processing of the plaintext blocks and encrypted blocks (i.e., encryption of the plaintext blocks into encrypted blocks, and decryption of these encrypted blocks). Thus, such dependencies include the encryption of one (or more) plaintext block(s) being dependent on (i) another one (or more) plaintext block(s) or (ii) encryption processing of the another one (or more) plaintext block(s), and further include the decryption of one (or more) ciphertext block(s) being dependent on another one (or more) ciphertext block(s) or decryption processing of the another one (or more) ciphertext block(s). Example common encryption modes that incorporate dependencies include, but are not limited to, cipher-block chaining (CBC), propagating cipher block chaining (PCBC), cipher feedback (CFB), and output feedback (OFB). Under modes that incorporate dependencies, the effect of one or more blocks being lost and unavailable for processing will propagate to the cryptographic processing of blocks to be subsequently-processed.

Figure 3:
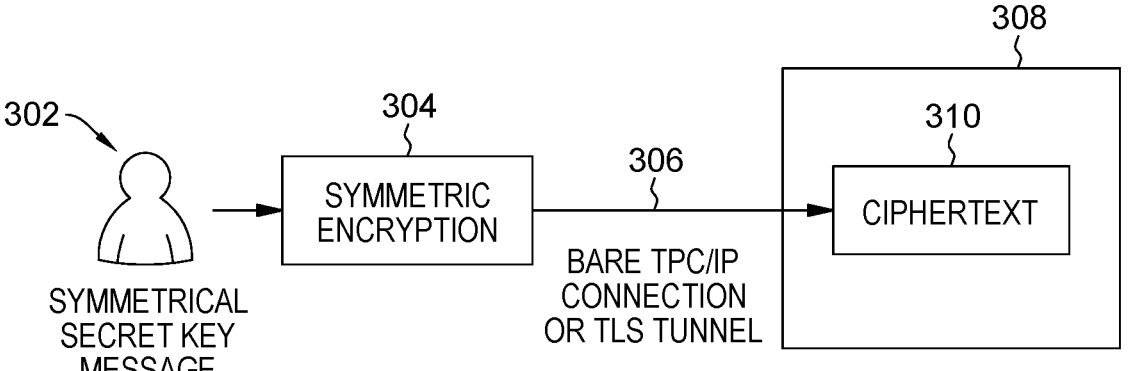
FIG. 3 depicts an example conceptual diagram of symmetric-key encryption.

Described herein are approaches for addressing and mitigating issues and impact of symmetric key and encrypted data leakage. Referring to FIG. 3, depicting an example conceptual diagram of symmetric-key encryption, a user 302 has a secret key and produces/provides a plaintext message. By plaintext message is meant the input data provided to an encryption process or that is produced by a decryption process. Plaintext message/data may be or contain human-readable text, but this need not be the case. In this regard, the message may be any data (even already-encrypted data) that is provided for (further) encryption. In all cases, the plaintext data/message is simply that which is provided for encryption to produce an encrypted version of what was input. The encrypted version can later be decrypted back to the original plaintext, which is to match what was input.

Continuing with FIG. 3, the plaintext message and secret key are provided to a symmetric encryption algorithm 304 to produce encrypted data. This encrypted data can be provided over a communication channel 306, such as a bare Transmission Control Protocol (TCP)/Internet Protocol (IP) connection or Transport Layer Security (TLS) tunnel, as examples, to a cloud environment 308 for storage as ciphertext 310. When the ciphertext 310 is to be decrypted, the ciphertext is processed by the symmetric encryption 304 using the secret key, to provide the plaintext message. In this scheme, loss of the secret key on the user device's filesystem or elsewhere is a security risk, as are security failures along the communication channel 306 and in the cloud environment. An attacker gaining the secret key and/or the ciphertext has potentially compromised the security of the user's message.

In accordance with an example embodiment, a method includes fragmenting and encrypting plaintext to produce encrypted data, distributing the encrypted data (and relocating the encrypted data when needed) to multiple regions/locations on physical nodes (separate entities to hold different portions of the encrypted data), and retrieving and assembling the encrypted data from these physical nodes for decryption. Aspects can be provided in public and/or private cloud environments, in some embodiments.

As described in further detail herein, aspects are facilitated by leveraging a propagate table, relocatable blocks, and a fragment-assemble engine (also referred to herein as a block distribution-assembly engine). The propagate table can be used for the generation of relocatable blocks, which are structures used in ciphertext distribution and assembly. The block distribution-assembly engine can distribute the relocatable blocks to target nodes, relocate the relocatable blocks when node-scaling, and retrieve and assemble ciphertext by sequence number for decryption, as explained herein.

Thus, in one aspect, a plurality of ciphertext blocks are packaged into a plurality of portable data structures, also referred to herein as "relocatable blocks". The ciphertext blocks are produced based on encryption of a plurality of plaintext blocks, the encryption including processing performed according to a block encryption mode. The block encryption mode can incorporate dependencies between the cryptographic processing of the plurality of plaintext blocks to produce the ciphertext blocks. The dependencies can incorporate dependency as to the decryption of the ciphertext blocks. For instance, decryption of a first ciphertext block can be dependent on (i) a second ciphertext block of the plurality of ciphertext blocks and/or (ii) decryption processing of the second ciphertext block. In other words, the decryption processing of one ciphertext block can be dependent on (rely on) another ciphertext block itself (as in CBC mode, for instance) and/or on the decryption processing of another ciphertext block (as in OFB mode, for instance). As is explained further below, for each ciphertext block, of the plurality of ciphertext blocks, that has a dependency on another ciphertext block (in that the decryption processing of the ciphertext block is dependent on the another ciphertext block itself and/or on decryption processing thereto), an associated dependency label can be provided in the relocatable block (portable data structure) in which that ciphertext block is packaged. The dependency label can indicate that other ciphertext block. In connection with the distribution of the portable data structures (relocatable blocks) to the nodes, blocks with direct dependencies therebetween can be distributed to different nodes, i.e., portable data structures that package ciphertext blocks between which dependency exists are distributed to different nodes.

Features of an example method can fragment a plaintext message into plaintext blocks, encrypt the plaintext blocks to encrypted data that includes individual encrypted blocks, distribute the encrypted data, relocate the encrypted data on node scaling events, and assemble the ciphertext blocks for decryption in public/private cloud environment(s). A propagate table can include an indication of an encryption mode and a propagate rule, which are used for the generation of relocatable blocks. Each relocatable block can include block data (an encrypted block), a sequence number, and a dependency label, the latter two of which may be used for ciphertext distribution and assembly. The dependency label may be set based on the propagate rule to identify the dependencies/relations between encrypted blocks. In accordance with an aspect, encrypted blocks that have a direct dependency therebetween are stored in different nodes so that an attacker gaining access to just one of those nodes cannot fully decrypt the encrypted data. A fragment-assemble engine can distribute the relocatable blocks to target nodes, relocate the relocatable blocks when the nodes scale, and assemble ciphertext based on the sequence numbers in the relocatable blocks for decryption.

Figure 4:
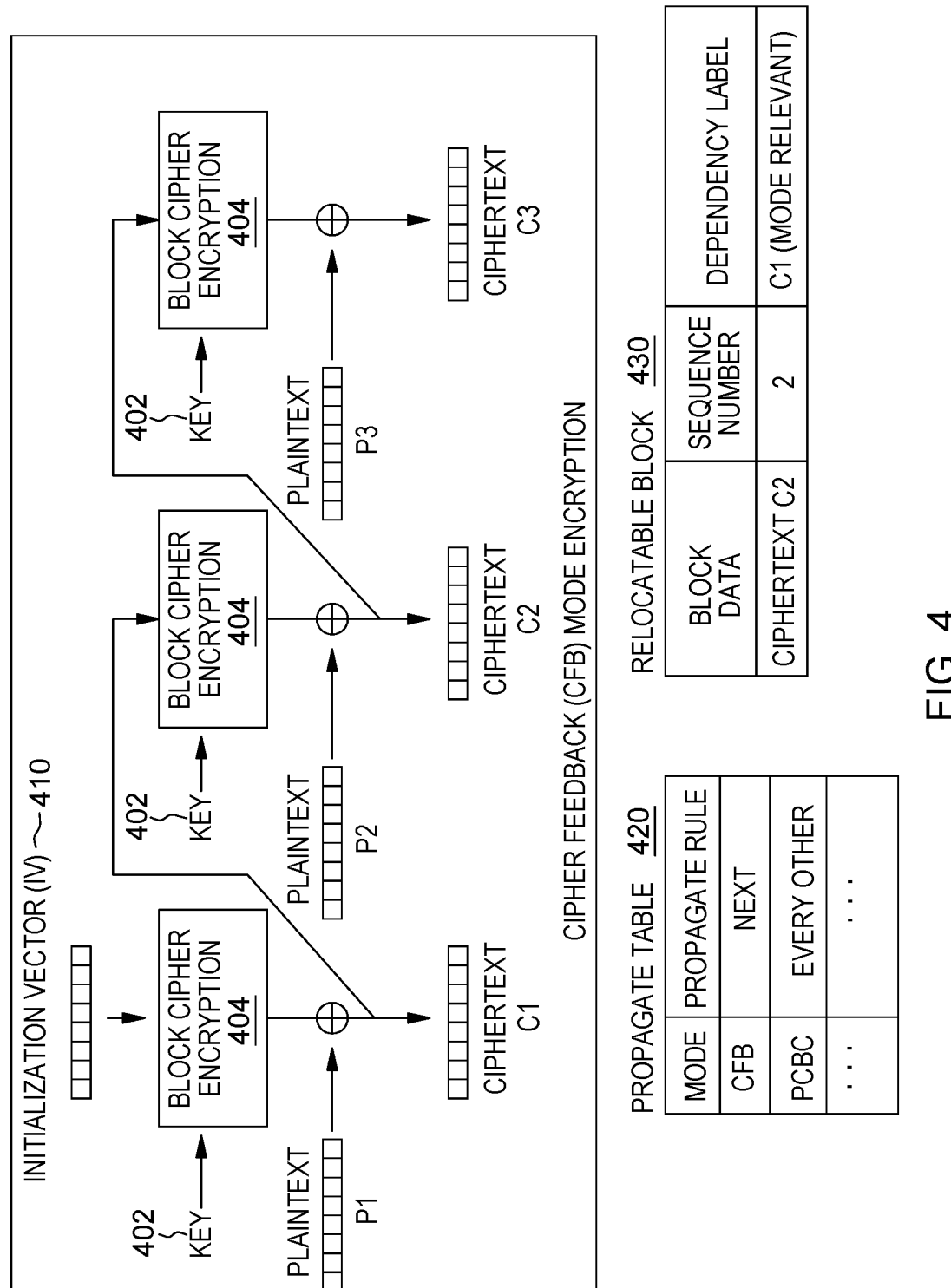
FIG. 4 depicts a conceptual example of combined cipher feedback mode encryption with data exposure protection in accordance with aspects described herein.

FIG. 4 depicts a conceptual example of combined cipher feedback mode encryption with data exposure protection in accordance with aspects described herein. One aspect of FIG. 4 is cipher feedback mode encryption on a plaintext message M (not pictured). The plaintext message M is broken into three plaintext blocks P1, P2, P3 in this example. In an example, P1, P2, and P3 are substrings of M, where the concatenation of P1, P2, and P3=M. In other examples, a plaintext message is blocked into any desired number of blocks. Under CFB as depicted in FIG. 4, the CFB block cipher encryption 404 encrypts an initialization vector (IV) 410 using secret key 402. The IV is data that helps seed and randomize the encryption. The processing XORs that result (the encrypted IV) with plaintext block P1 to obtain ciphertext C1. In this regard, the cryptographic operation to XOR the plaintext P1 with the result of the block cipher encryption is considered encryption of the plaintext P1. This encryption result C1 is then fed back to CFB block cipher encryption 404 which encrypts C1 using secret key 402 and XORs that result with plaintext block P2 to obtain ciphertext C2. There is a dependency between C1 and C2 in this regard, since C1 is used to produce C2. C2 is then fed to the next phase as was C1, in which C2 is fed back to CFB block cipher encryption 404, which encrypts C2 using secret key 402 and XORs that result with plaintext block P3 to obtain ciphertext C3. There is a dependency between C2 and C3 in this regard. It is seen that the encryption proceeds as a chain, and in practice may proceed in successive iterations of processing where input(s) are provided to the encryption processing to produce output(s) that may be used as input(s) to the next iteration.

A propagate table and relocatable blocks (portable data structures) are provided to facilitate aspects described herein. FIG. 4 shows propagate table 420 and one relocatable block 430. The propagate table 420 is used to inform a block encryption mode to use of potentially multiple available block encryption modes. The table can indicate for each such mode what the respective propagate rule(s) are for that mode. A propagate rule defines propagating characteristic(s), or dependency, between data blocks in cryptographic processing according to that block encryption mode. Thus, for instance, propagate table 420 indicates the "CFB" mode and the propagate rule "NEXT", indicating that the ciphertext at one block is propagated to the next block. CFB would propagate an error ciphertext (one which an attacker does not have access to) to the next block, which would pollute the result of that block and downstream results, rendering an incorrect plaintext message.

The relocatable blocks indicate block data, sequence numbers, and dependency labels. Here, just one relocatable block 430 is shown show—the block packaging ciphertext C2. Ciphertext C2 data is provided in block 430, as is a sequence number of 2 because C2 is in the second position, after C1, and before C3. Meanwhile, relocatable block 430 indicates a dependency label of C1 because the processing to produce C2 depends on C1 as input to the block cipher encryption 404. The relocatable block storing C1 would be distributed for purposes of storage to a node that is different from the node to which relocatable block 430 storing C2 is distributes for storage on account of this dependency. Though the relation between C2 and C3 is not indicated by block 430, it will be indicated in the relocatable block for C3, and the relocatable block 430 storing C2 and relocatable block storing C3 would be stored on separate nodes as well. It is noted that the relocatable blocks storing C1 and C3 could be stored on a same node because there is not a direct dependency as between C1 and C3; instead there is an indirect dependency as between them on account of the intervening cryptographic processing relative to C2.

The dependency label can represent that a given ciphertext's error or loss can propagate to another ciphertext block. C1's error or loss always causes erroneous decryption of C2 to P2, for instance (see FIG. 5). The dependency label is encryption mode relevant. For CFB mode as in this example, C1 is only propagated to the next block, C2. For other modes, the propagating characteristic may be different.

Each relocatable block packaging a ciphertext block can also store an associated sequence number that facilitates assembly of decrypted data blocks that are decrypted from the ciphertext blocks, to obtain a plaintext data message. In a basic example, the plaintext message is divided into a sequence of n number of blocks, and the sequence number assigned to each block is its ordinality in the sequence—the first block has sequence number 1, second block has sequence number 2, etc. The point of the sequence number is to inform the assembly of decrypted (plaintext) items in a way that is consistent with how the original plaintext message was broken down into these plaintext items.

In some examples, more than one ciphertext block may be packaged together into a single relocatable block that includes respective block data, sequence number, and dependency label for each such ciphertext block. However, in other examples, each portable data structure of the plurality of portable data structures packages just a single ciphertext block, dependency label associated with the single ciphertext block, and sequence number indicating assembly sequence of decrypted data blocks.

Figure 5:
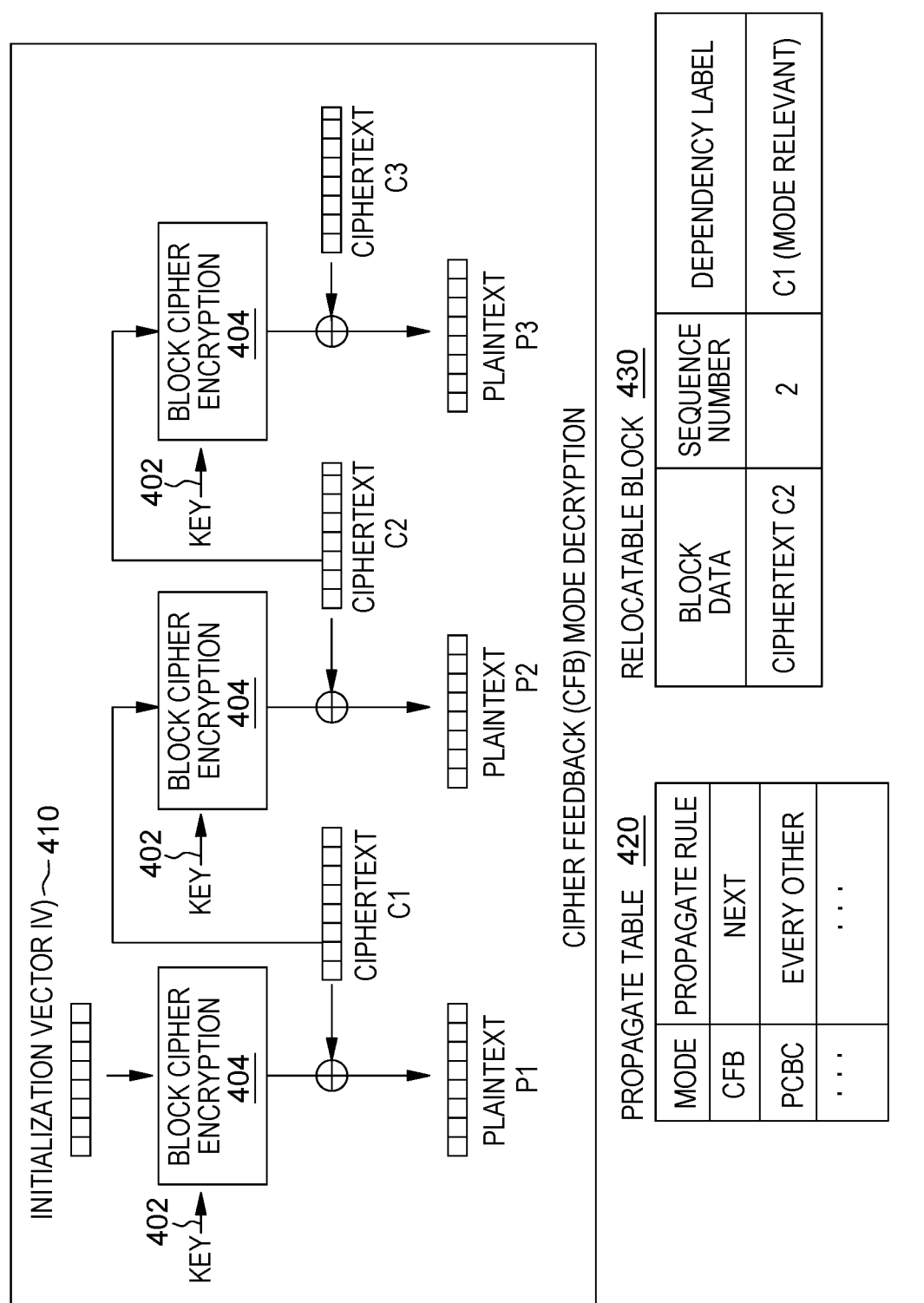
FIG. 5 depicts a conceptual example of decryption processing associated with the encryption according to FIG. 4, in accordance with aspects described herein.

FIG. 5 depicts a conceptual example of decryption processing associated with the encryption according to FIG. 4, in accordance with aspects described herein. The decryption processing may be invoked based on a request to decrypt the plurality of ciphertext blocks and in general obtains the relocatable blocks that package the ciphertexts (C1, C2, C3) and that were distributed to a plurality of nodes, obtains the secret key 402, extracts the ciphertext blocks (C1, C2, C3) from the plurality of relocatable blocks, applies the block cipher encryption 404 to decrypt each of the ciphertext blocks (C1, C2, C3) according to the block encryption mode and dependencies thereof to obtain plaintext blocks P1, P2, P3, and assembles these decrypted plaintext blocks pursuant to the sequence numbers to produce a plaintext message M' that should match the original input message M.

In FIG. 5, the IV 410 and secret key 404 are used again with the CFB block cipher encryption 404 and the result is XORd with ciphertext C1 to obtain plaintext P1. This processing constitutes cryptographic processing, specifically decryption processing, to decrypt ciphertext to plaintext. C1 is also fed back to CFB block cipher encryption 404 with key 402 to produce a result that is XORd with ciphertext block C2 to obtain plaintext block P2, and so on. The decrypted plaintext (data blocks P1, P2, P2) can be joined/concatenated into a plaintext message that matches the initial plaintext message that was input to the encryption processing of FIG. 4.

Figure 6:
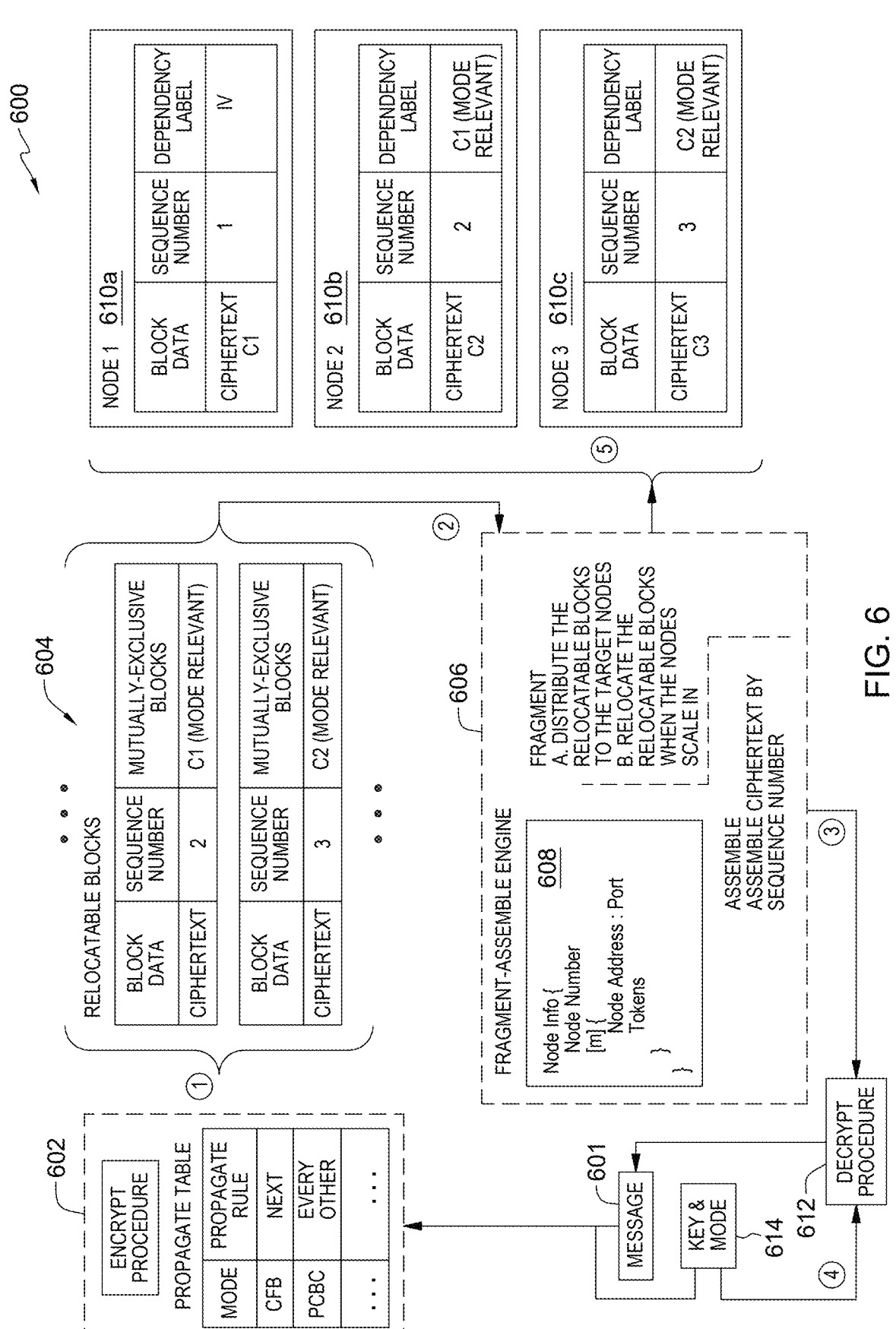
FIG. 6 depicts an example architecture and workflow to illustrate aspects presented herein.

FIG. 6 depicts an example architecture and workflow to illustrate aspects presented herein. Initially, an encrypt procedure (mode) and propagate table are provided (602) for cryptographic processing to be performed for a plaintext data message M (601) to be encrypted. At 1, the plaintext data message is broken into plaintext blocks and the encrypt procedure uses the common symmetric key and a specific encryption mode to encrypt the plaintext blocks into ciphertext blocks and package them into relocatable blocks (two of which are shown in FIG. 6). At 2, the relocatable blocks are provided to a fragment-assemble engine 606 that distributes the relocatable blocks to a plurality of target nodes. The engine 606 keeps node information 608, such as node number/identifier, address/port combinations of the nodes, and access tokens to access the nodes. The target nodes 610a, 610b, 610c may be on private or public networks, and may be provided as part of private and/or public cloud environment(s). In specific examples, each node is a discrete and different physical computer system, though in other examples the nodes are completely virtualized or otherwise provided in software. In examples, the nodes are located remote from each other—physically and/or geographically dispersed. In this example, there are three nodes 610a, 610b, 610c that each store a respective relocatable block—one for ciphertext C1, one for ciphertext C2, and one for ciphertext C3 (there may be more ciphertext blocks and more relocatable blocks, not shown). Here, each relocatable block is stored on its own node, and no two relocatable blocks are stored on a same node, in this example.

The engine 606 can also handle relocation/redistribution of one or more relocatable blocks when appropriate, for instance when the number of available nodes increases or decreases (scales). Based on scaling the number of nodes to a different number, the engine might need to redistribute one or more of the relocatable blocks, as is explained below with reference to FIG. 7.

In any case, the relocatable blocks are distributed and stored to a collection of different nodes. Based on a request for a decryption of the original message M, the engine 606 can retrieve the distributed relocatable blocks from the nodes and assemble them/the ciphertext blocks by sequence number to provide (at 3) to a decrypt procedure 612. The decrypt procedure reads the ciphertext blocks and (at 4) uses the symmetric key and specific encryption mode 614 to decrypt the ciphertext blocks to obtain decrypted data blocks. At this point, the decrypted data blocks should (assuming no data corruption) match the plaintext blocks into which the original input message M 601 was segmented. The decrypted data blocks are then combined to form message 601.

Figure 7:
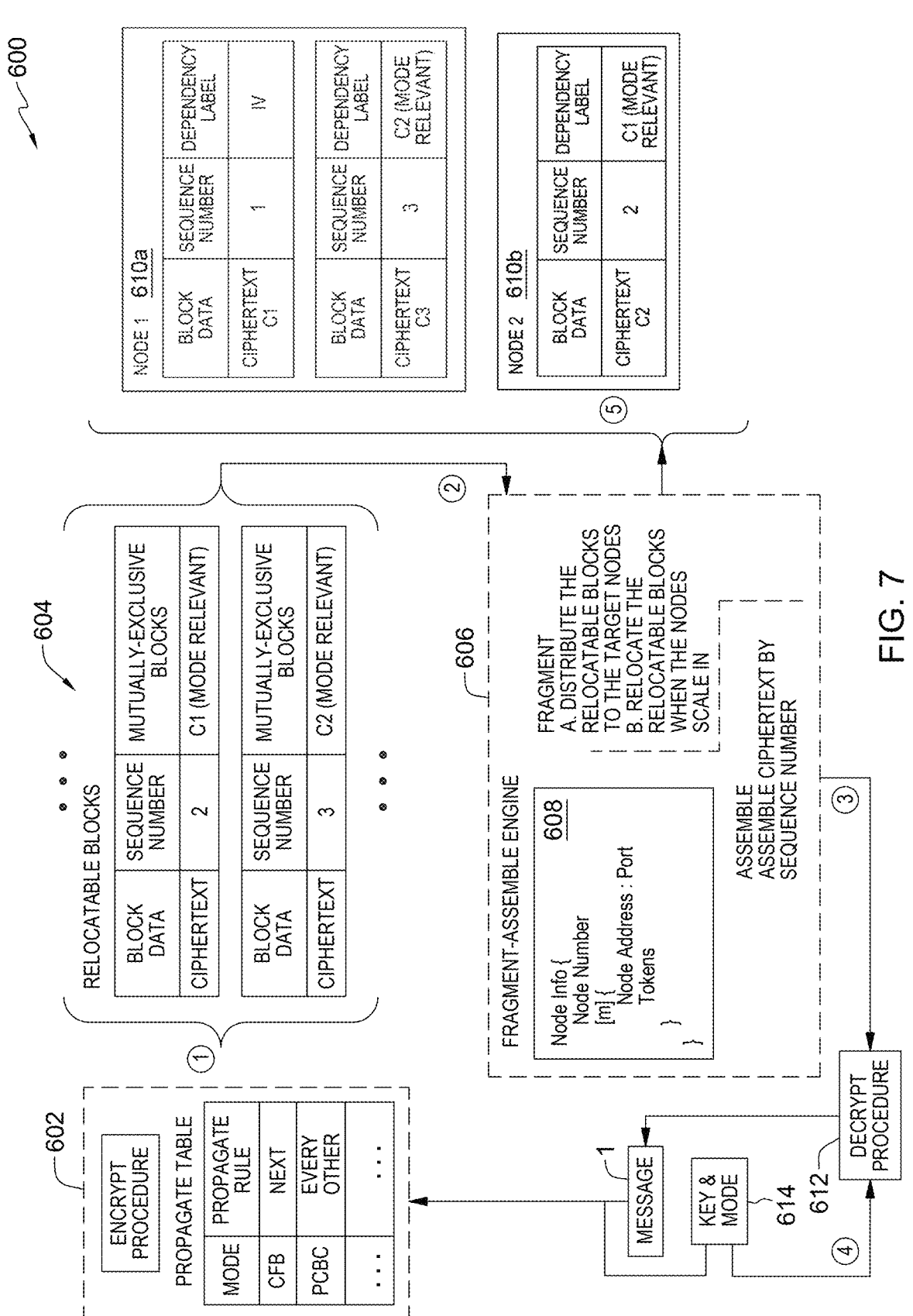
FIG. 7 depicts the architecture of FIG. 6 after node scaling, in accordance with aspects described herein.

FIG. 7 depicts the architecture of FIG. 6 after node scaling, in accordance with aspects described herein. In this example, the collection of nodes is being scaled down (reduce the number of nodes in the collection/pool) to eliminate node 3 610c. The relocatable block stored thereon is therefore redistributed such that it is stored on node 1 610a, which now stores the two relocatable blocks shown thereon. Thus, if the cluster scales in as shown, engine 606 first retrieves relocatable block(s) from node 3 and then relocate it/them to an existing node (node 1 here). Alternatively, if node 3 is being replaced with a new node, the block(s) could be distributed to the new node.

It is noted that the two relocatable blocks stored on node 1 610a hold ciphertext C1 and C3, and these two ciphertext blocks do not have a direct dependency as between then, as evidenced by the dependency labels of the two relocatable blocks.

In examples where the nodes are scaled out (to add more nodes), then this presents an opportunity to redistribute one or more relocatable blocks. In one example, node(s) storing more than one relocatable block can be identified and one or more relocatable block(s) from one or more of such node(s) can be removed and stored on one of the added nodes, in an effort to spread the blocks across a greater number of nodes. Additionally or alternatively, the scale event could prompt a redistribution of relocatable blocks to change where they are stored as a security measure, so that any given relocatable block is noted persisted in one location for an undesirably long amount of time.

Figure 8:
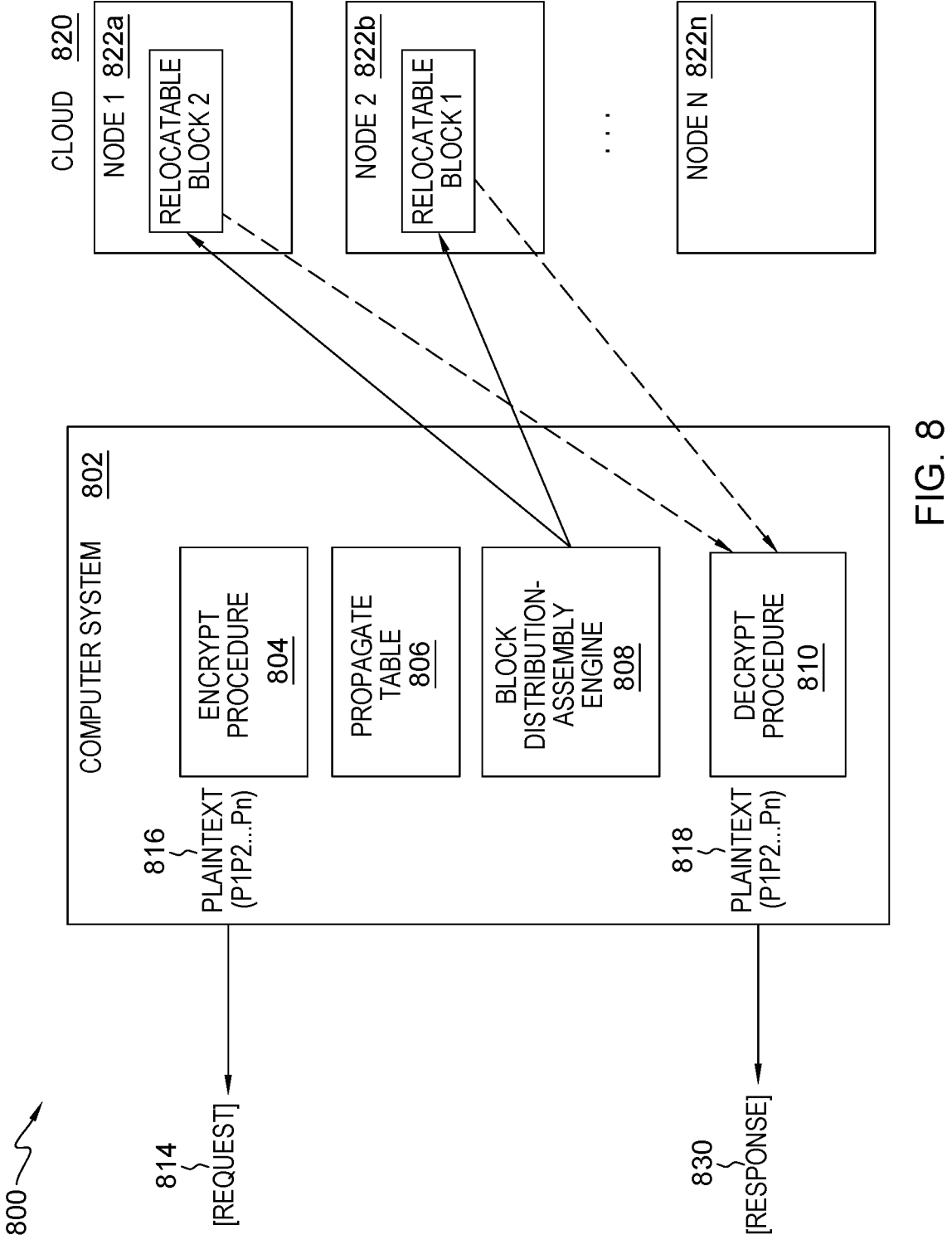
FIG. 8 depicts another example environment to incorporate and use aspects described herein.

FIG. 8 depicts another example environment to incorporate and use aspects described herein. Environment 800 includes a computer system 802 and a cloud environment 820. Computer system 802 includes encrypt procedure 804, propagate table 806, block distribution-assembly engine 808, and decrypt procedure 810. Procedures 804, 810 and engine 808 could be implemented as executable program code forming software/programs, while propagate table 806 could be implemented as a data structure, for instance.

The encrypt procedure 804 receives a request 814 that includes a plaintext data message 816 to be encrypted. The message could be a password or other string of text, such as one typed by a user or read from a data file, as examples. Alternatively, the message could be a data file itself. The encrypt procedure 804 is used as explained above in conjunction with propagate table 806 and block distribution-assembly engine 810. This results in the distribution of relocatable blocks on nodes of cloud 820, which includes 822a, 822b, . . . , 822n. Here, only two relocatable blocks are shown for illustrative purposes only. The decrypt procedure 810 can obtain the distributed relocatable blocks for performing decryption. The decrypt procedure 810 decrypts the ciphertext to plaintext 818, which is provided as part of a response 830.

The computer system 802 can receive request 814 from a request entity and provide the response 830 to a response entity. In examples, the request and response entities are the same entity, such as a specific user/system, though they could be different entities. The request entity could be a user that provides the request directly to computer system 802, for instance using an input device. The user could, for instance, type plaintext 816 on a keyboard as an input device to computer system 802. Similarly, the response could be provided to the user via an output device, such as a computer monitor/display device of computer system 802.

Alternatively, the request could be received from (and/or the response provided to) a computer system that is different from computer system 802. For instance, the computer system 802 could be a server that hosts components 804, 806, 808, 810, the server being in communication with a client/user device (computer system). The client device can transmit the request to the server 802 in this example. It is noted, as explained above, that there might be additional layer(s) of encryption/decryption unrelated to the cryptographic processing described herein that is performed by 802. The provided plaintext message and/or request itself might be provided in an encrypted form to 802, for instance in situations where the user device communicates to device 802 over a TLS or similar communication channel. In this regard, the request/plaintext message 816 could include encrypted data. In this example, however, system 802 would receive the TLS message and decrypt it to arrive at source data that is referred to as the plaintext 816 in this example. However, in some situations, the plaintext data 816 is itself already encrypted. Regardless, for purposes of aspects described herein, it is treated as plaintext input that is to be secured.

Figure 9:
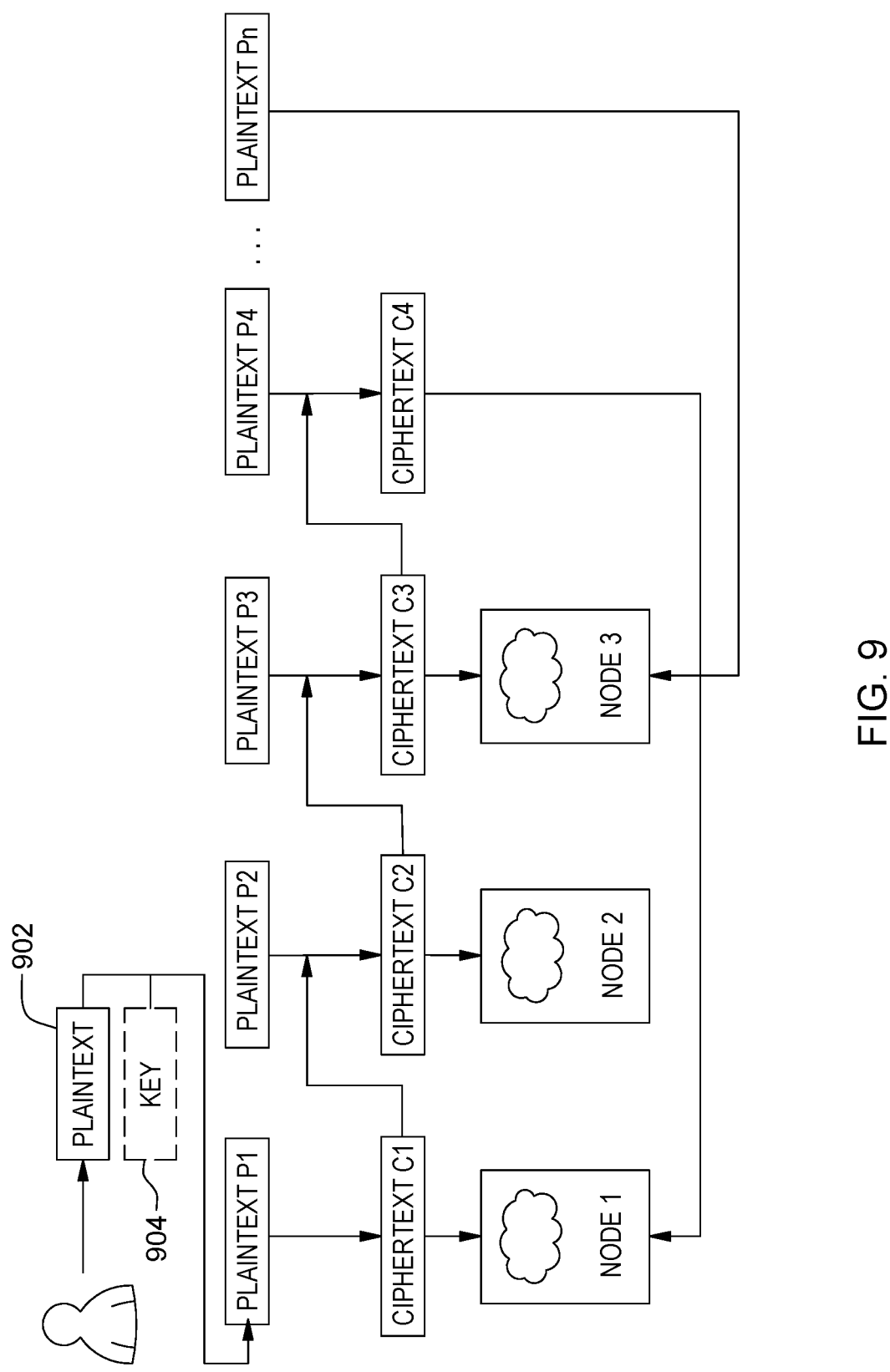
FIG. 9 illustrates example data leakage scenarios that aspects described herein can advantageously address.

FIG. 9 illustrates example data leakage scenarios that aspects described herein can advantageously address. Plaintext message 902 and key 904 are used in cryptographic processing to produce plaintext bocks P1, P2, . . . , Pn. The plaintext blocks are encrypted to ciphertext blocks C1, C2, C3, C4, . . . , which are stored on nodes. Here, nodes 1, 2, and 3 are shown (some ciphertext blocks and nodes are omitted for simplicity). There might be situations in which data is leaked, for instance a nefarious actor gains access to key 904 and/or a subset of various ciphertext block(s) C1, C2, C3, C4, etc. Since each ciphertext block is critical information (provided dependencies exist as between ciphertext blocks for purposes of decryption), then lacking just one of the ciphertext blocks renders the nefarious actor unable to obtain the entire original plaintext message. Additionally, since the relocatable blocks provide sequence information, this adds a further element of security, even in situations where all of the ciphertext blocks are available to decrypt.

Approaches and features discussed herein help prevent attackers from obtaining the original plaintext message if data leakage occurs. Even if a user's secret key and all but one ciphertext block are compromised, at least a portion of the decryption cannot be performed since, at some point, the missing ciphertext block is needed in some aspect of the decryption processing.

Figure 10:
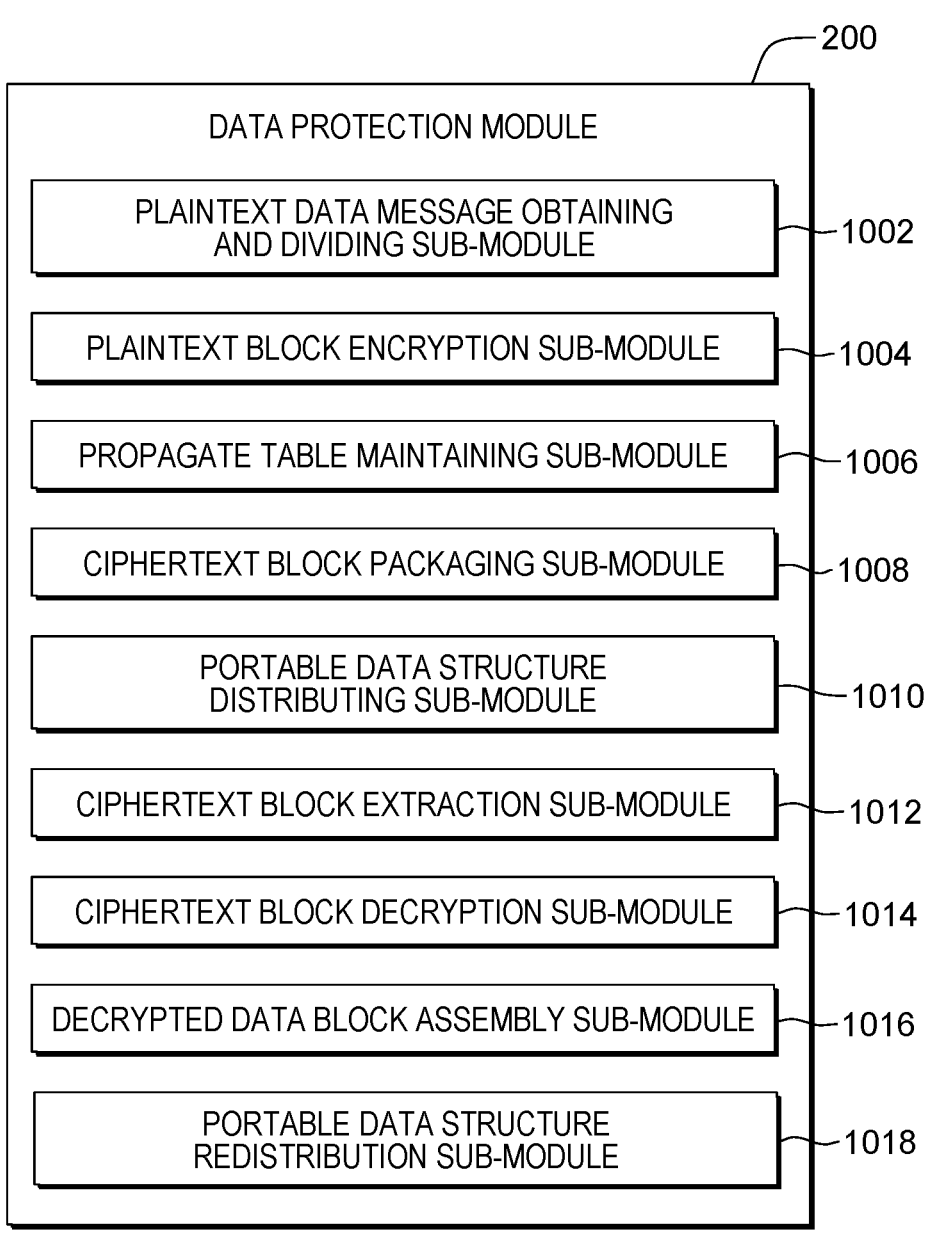
FIG. 10 depicts further details of an example data protection module to incorporate and/or use aspects described herein.

FIG. 10 depicts further details of an example data protection module (e.g., data protection module 200 of FIG. 1) to incorporate and/or use aspects described herein. In one or more aspects, data protection module 200) includes, in one example, various sub-modules to be used to perform data protection using portable data structures. The sub-modules can be or include, e.g., computer readable program code (e.g., instructions) in computer readable media, e.g., persistent storage (e.g., persistent storage 113, such as a disk) and/or a cache (e.g., cache 121), as examples. The computer readable media may be part of a computer program product and may be executed by and/or using one or more computers or devices, and/or processor(s) or processing circuitry thereof, such as computer(s) 101, EUD 103, server 104, or computers of cloud 105/106 of FIG. 1, as examples.

Referring to FIG. 10, data protection module 200 includes a plaintext data message obtaining and dividing sub-module 1002 to obtain a plaintext data message to be encrypted and divide the plaintext data message into the plurality of plaintext blocks; a plaintext block encryption sub-module 1004 to encrypt each plaintext block of the plurality of plaintext blocks according to a block encryption mode and produce a plurality of ciphertext blocks; a propagate table maintaining sub-module 1006 to maintain a propagate table that indicates, for various encryption modes, respective propagate rules that define dependencies between data blocks in cryptographic processing according to the encryption mode; a ciphertext block packaging sub-module 1008 to package the plurality of ciphertext blocks into a plurality of portable data structures; a portable data structure distributing sub-module 1010 to distribute the plurality of portable data structures to a plurality of nodes; a ciphertext block extraction sub-module 1012 to obtain the distributed plurality of portable data structures from the plurality of nodes and extract the plurality of ciphertext blocks from the plurality of portable data structures; a ciphertext block decryption sub-module 1014 to decrypt each ciphertext block of the plurality of ciphertext blocks according to the block encryption mode and dependencies thereof to obtain decrypted data blocks; a decrypted data block assembly sub-module 1016 to assemble the decrypted data blocks based on sequence numbers associated with the ciphertext blocks to produce the plaintext data message for a requesting entity; and a portable data structure redistribution sub-module 1018 to redistribute one or more portable data structures of the plurality of portable data structures based on scaling the plurality of nodes to a different number of nodes.

Figure 11:
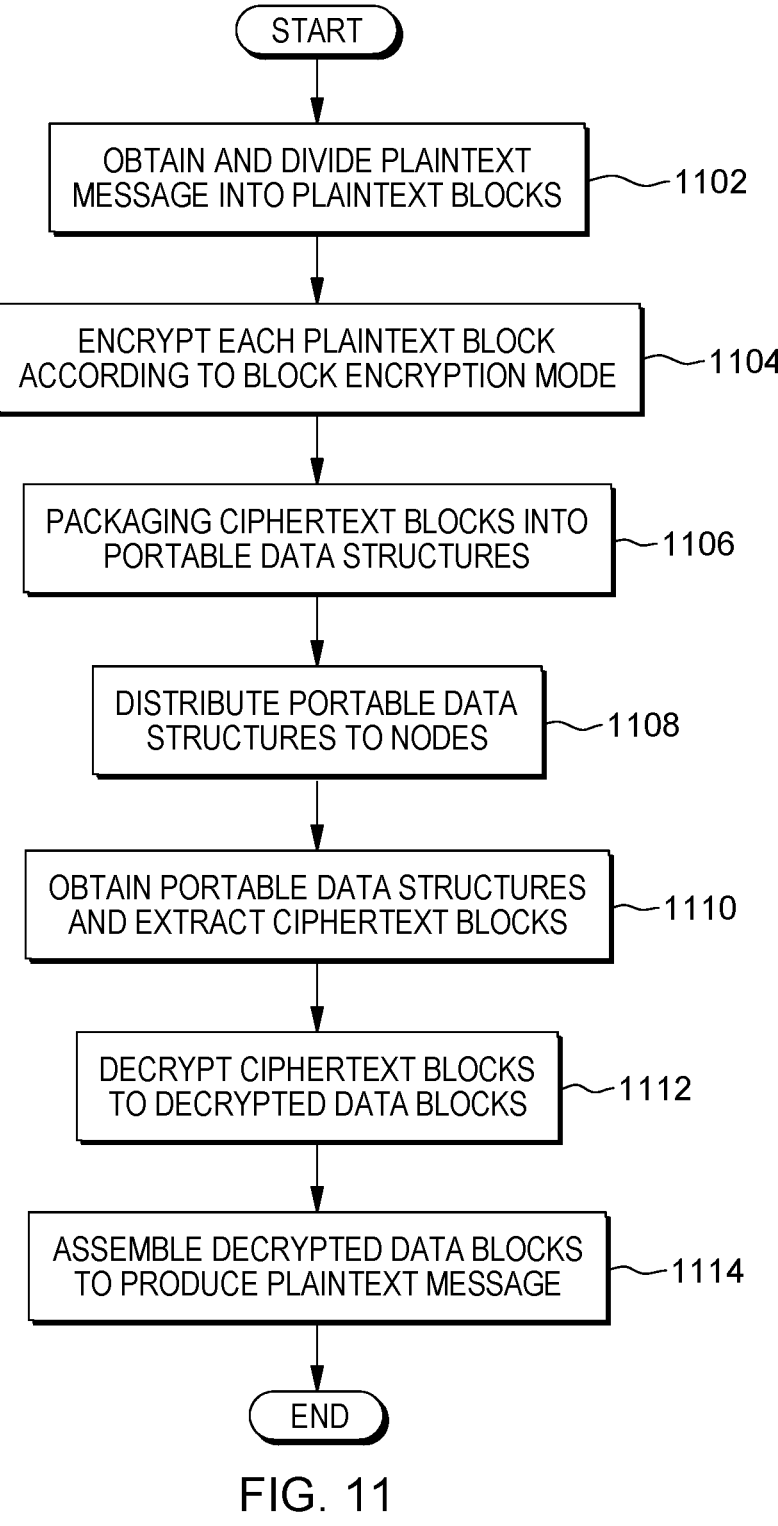
FIG. 11 depicts an example process for data protection using portable data structures, in accordance with aspects described herein.

FIG. 11 depicts an example process for data protection using portable data structures, in accordance with aspects described herein. The process may be executed, in one or more examples, by a processor or processing circuitry of one or more computers/computer systems, such as those described herein, and more specifically those described with reference to FIG. 1. In one example, code or instructions implementing the process(es) of FIG. 11 are part of a module, such as module 200. In other examples, the code may be included in one or more modules and/or in one or more sub-modules of the one or more modules. Various options are available. By way of specific example, the process of FIG. 11 can encompass activity of a server/system that has encryption and decryption procedures, and a block distribution-assembly engine.

The process of FIG. 11 includes encryption processing, for instance processing for obtaining and dividing (1002) a plaintext data message to be encrypted into a plurality of plaintext blocks, and for encrypting (1104) each plaintext block of the plurality of plaintext blocks according to a block encryption mode to produce a plurality of ciphertext blocks. The block encryption mode can include dependencies between cryptographic processing of the plurality of plaintext blocks, the dependencies including decryption of a first ciphertext block of the plurality of ciphertext blocks being dependent on a second ciphertext block of the plurality of ciphertext blocks or decryption processing of the second ciphertext block. In other words, the decryption of one ciphertext block may be dependent on (i) another ciphertext block itself and/or on (ii) decryption processing of that another ciphertext block.

The block encryption mode can be one block encryption mode of a plurality of available block encryption modes. In this case, the process can maintain a propagate table that indicates, for each block encryption mode of the plurality of available block encryption modes, a respective propagate rule that defines dependency between data blocks in cryptographic processing according to that block encryption mode.

Continuing with FIG. 11, the process includes packaging (1106) the plurality of ciphertext blocks into a plurality of portable data structures. The packaging can include including, for each ciphertext block, of the plurality of ciphertext blocks, having a dependency on another ciphertext block, an associated dependency label in the portable data structure in which that ciphertext block is packaged, the dependency label indicating the another ciphertext block. In this manner, any dependency that one ciphertext block has, in terms of cryptographic processing of the one ciphertext block, one another ciphertext block is identified in the portable data structure packaging that one ciphertext block.

In examples, the each portable data structure of the plurality of portable data structures packages a single ciphertext block, dependency label associated with the single ciphertext block, and a sequence number indicating assembly sequence of decrypted data blocks, though in other examples a single portable data structure packages such information for more than one ciphertext block. In examples, the packaging includes including, for each ciphertext block of the plurality of ciphertext blocks, an associated sequence number in the portable data structure in which the ciphertext block is packaged, the sequence number facilitating assembly of decrypted data blocks that are decrypted from the plurality of ciphertext blocks, to obtain a plaintext data message.

FIG. 11 also includes distributing (1108) the plurality of portable data structures to a plurality of nodes such that portable data structures, of the plurality of portable data structures, that package ciphertext blocks between which at least one dependency exists are distributed to different nodes of the plurality of nodes. In this manner, the relocatable blocks are distributed so that any relocatable blocks that house ciphertext between which a dependency exists are placed on different nodes. In examples, the plurality of nodes are located remote from each other, for instance physically and/or geographically dispersed.

At some point, a request might be received to decrypt the ciphertext blocks, for instance for assembly back into the plaintext message. Thus, FIG. 11 includes, based on a request to decrypt the plurality of ciphertext blocks, obtaining the distributed plurality of portable data structures from the plurality of nodes and extracting (1110) the plurality of ciphertext blocks from the plurality of portable data structures, then decrypting (1112) each ciphertext block of the plurality of ciphertext blocks according to the block encryption mode and dependencies thereof to obtain the decrypted data blocks. The decrypted data blocks are expected to match the plurality of plaintext blocks that were encrypted at 1104. The encryption mode used will have dependencies between the cryptographic processing involved for varying blocks. The dependencies seen when encrypting the plaintext blocks are to be accounted—for when decrypting the ciphertext blocks (encrypted versions of the plaintext blocks). With the decrypted data blocks, the method can use the sequence numbers to assemble the decrypted data into the plaintext message. Thus, FIG. 11 includes assembling (1114) the decrypted data blocks based on the sequence number associated with each ciphertext block to produce the plaintext data message (of 1102) for a requesting entity.

As an enhancement, one or more of the relocatable blocks might be redistributed for any desired reason. One such reason is if the number of nodes involved scales. Thus, the process could redistribute one or more portable data structures of the plurality of portable data structures based on scaling the plurality of nodes to a different number of nodes. Based on scaling the plurality of nodes to a lesser number of nodes, the redistributing might, for instance, result in one or more of the nodes storing a respective two or more portable data structures.

Although various embodiments are described above, these are only examples.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
packaging a plurality of ciphertext blocks into a plurality of portable data structures, the plurality of ciphertext blocks produced based on encryption of a plurality of plaintext blocks according to a block encryption mode that comprises dependencies between cryptographic processing of the plurality of plaintext blocks, the dependencies comprising decryption of a first ciphertext block of the plurality of ciphertext blocks being dependent on a second ciphertext block of the plurality of ciphertext blocks or decryption processing of the second ciphertext block, wherein the packaging comprises including, for each ciphertext block, of the plurality of ciphertext blocks, having a direct dependency on another ciphertext block, an associated dependency label in the portable data structure in which the ciphertext block is packaged, the dependency label indicating the another ciphertext block, and wherein the portable data structure in which the ciphertext block is packaged includes a respective sequence number associated with the ciphertext block;
distributing the plurality of portable data structures to a plurality of nodes such that separation is provided between portable data structures, of the plurality of portable data structures, that package ciphertext blocks between which there exists direct dependencies indicated by the dependency labels included in the portable data structures, wherein at least one direct dependency as indicated by a dependency label exists between one ciphertext block packaged in one portable data structure of the plurality of portable data structures and another ciphertext block packaged into another portable data structure of the plurality of portable data structures, and wherein, based on the at least one direct dependency, the distributing distributes the one portable data structure to one node of the plurality of nodes and distributes the another portable data structure to another node, of the plurality of nodes, that is different from the one node, and storage of the one portable data structure and the another portable data structure on a same node of the plurality of nodes is avoided on account of the at least one direct dependency; and
in response to a request to decrypt the plurality of ciphertext blocks:

decrypting the plurality of ciphertext blocks to obtain decrypted data blocks; and
assembling the decrypted data blocks to obtain a plaintext data message, the assembling being performed based on the respective sequence numbers associated with the plurality of ciphertext blocks.

2. The method of claim 1, wherein the packaging includes, for each ciphertext block of the plurality of ciphertext blocks, the respective sequence number associated with the ciphertext block in the portable data structure in which the ciphertext block is packaged.

3. The method of claim 2, further comprising, in response to the request to decrypt the plurality of ciphertext blocks:
obtaining the distributed plurality of portable data structures from the plurality of nodes; and
extracting the plurality of ciphertext blocks from the plurality of portable data structures;
wherein the decrypting decrypts the plurality of ciphertext blocks according to the block encryption mode and dependencies thereof to obtain the decrypted data blocks, the decrypted data blocks matching the plurality of plaintext blocks.

4. The method of claim 1, further comprising:
obtaining a plaintext data message to be encrypted;
dividing the plaintext data message to be encrypted into the plurality of plaintext blocks; and
encrypting each plaintext block of the plurality of plaintext blocks according to the block encryption mode to produce the plurality of ciphertext blocks.

5. The method of claim 1, wherein each portable data structure of the plurality of portable data structures packages a single ciphertext block, dependency label associated with the single ciphertext block, and a sequence number indicating assembly sequence of decrypted data blocks.

6. The method of claim 1, wherein the block encryption mode is one block encryption mode of a plurality of available block encryption modes, and wherein the method further comprises maintaining a propagate table that indicates, for each block encryption mode of the plurality of available block encryption modes, a respective propagate rule that defines dependency between data blocks in cryptographic processing according to that block encryption mode.

7. The method of claim 1, wherein the plurality of nodes are located remote from each other.

8. The method of claim 1, further comprising redistributing one or more portable data structures of the plurality of portable data structures based on scaling the plurality of nodes to a different number of nodes.

9. The method of claim 8, wherein based on scaling the plurality of nodes to a lesser number of nodes and on the redistributing, at least one node of the plurality of different nodes stores at least two portable data structures of the plurality of portable data structures.

10. A computer system comprising:
a memory; and
a processor in communication with the memory, wherein the computer system is configured to perform a method comprising:
packaging a plurality of ciphertext blocks into a plurality of portable data structures, the plurality of ciphertext blocks produced based on encryption of a plurality of plaintext blocks according to a block encryption mode that comprises dependencies between cryptographic processing of the plurality of plaintext blocks, the dependencies comprising decryption of a first ciphertext block of the plurality of ciphertext blocks being dependent on a second ciphertext block of the plurality of ciphertext blocks or decryption processing of the second ciphertext block, wherein the packaging comprises including, for each ciphertext block, of the plurality of ciphertext blocks, having a direct dependency on another ciphertext block, an associated dependency label in the portable data structure in which the ciphertext block is packaged, the dependency label indicating the another ciphertext block, and wherein the portable data structure in which the ciphertext block is packaged includes a respective sequence number associated with the ciphertext block;

distributing the plurality of portable data structures to a plurality of nodes such that separation is provided between portable data structures, of the plurality of portable data structures, that package ciphertext blocks between which there exists direct dependencies indicated by the dependency labels included in the portable data structures, wherein at least one direct dependency as indicated by a dependency label exists between one ciphertext block packaged in one portable data structure of the plurality of portable data structures and another ciphertext block packaged into another portable data structure of the plurality of portable data structures, and wherein, based on the at least one direct dependency, the distributing distributes the one portable data structure to one node of the plurality of nodes and distributes the another portable data structure to another node, of the plurality of nodes, that is different from the one node, and storage of the one portable data structure and the another portable data structure on a same node of the plurality of nodes is avoided on account of the at least one direct dependency; and in response to a request to decrypt the plurality of ciphertext blocks:

decrypting the plurality of ciphertext blocks to obtain decrypted data blocks; and assembling the decrypted data blocks to obtain a plaintext data message, the assembling being performed based on the respective sequence numbers associated with the plurality of ciphertext blocks.

11. The computer system of claim 10, wherein the packaging includes, for each ciphertext block of the plurality of ciphertext blocks, the respective sequence number associated with the ciphertext block in the portable data structure in which the ciphertext block is packaged.

12. The computer system of claim 11, wherein the method further comprises, in response to the request to decrypt the plurality of ciphertext blocks:

obtaining the distributed plurality of portable data structures from the plurality of nodes; and extracting the plurality of ciphertext blocks from the plurality of portable data structures;

wherein the decrypting decrypts the plurality of ciphertext blocks according to the block encryption mode and dependencies thereof to obtain the decrypted data blocks, the decrypted data blocks matching the plurality of plaintext blocks.

13. The computer system of claim 10, wherein each portable data structure of the plurality of portable data structures packages a single ciphertext block, dependency label associated with the single ciphertext block, and a sequence number indicating assembly sequence of decrypted data blocks.

14. The computer system of claim 10, wherein the plurality of nodes are located remote from each other.

15. The computer system of claim 10, wherein the method further comprises redistributing one or more portable data structures of the plurality of portable data structures based on scaling the plurality of nodes to a different number of nodes.

16. A computer program product comprising:

a non-transitory computer readable storage medium readable by a processing circuit and storing instructions for execution by the processing circuit for performing a method comprising:

packaging a plurality of ciphertext blocks into a plurality of portable data structures, the plurality of ciphertext blocks produced based on encryption of a plurality of plaintext blocks according to a block encryption mode that comprises dependencies between cryptographic processing of the plurality of plaintext blocks, the dependencies comprising decryption of a first ciphertext block of the plurality of ciphertext blocks being dependent on a second ciphertext block of the plurality of ciphertext blocks or decryption processing of the second ciphertext block, wherein the packaging comprises including, for each ciphertext block, of the plurality of ciphertext blocks, having a direct dependency on another ciphertext block, an associated dependency label in the portable data structure in which the ciphertext block is packaged, the dependency label indicating the another ciphertext block, and wherein the portable data structure in which the ciphertext block is packaged includes a respective sequence number associated with the ciphertext block;

distributing the plurality of portable data structures to a plurality of nodes such that separation is provided between portable data structures, of the plurality of portable data structures, that package ciphertext blocks between which there exists direct dependencies indicated by the dependency labels included in the portable data structures, wherein at least one direct dependency as indicated by a dependency label exists between one ciphertext block packaged in one portable data structure of the plurality of portable data structures and another ciphertext block packaged into another portable data structure of the plurality of portable data structures, and wherein, based on the at least one direct dependency, the distributing distributes the one portable data structure to one node of the plurality of nodes and distributes the another portable data structure to another node, of the plurality of nodes, that is different from the one node, and storage of the one portable data structure and the another portable data structure on a same node of the plurality of nodes is avoided on account of the at least one direct dependency; and in response to a request to decrypt the plurality of ciphertext blocks:

decrypting the plurality of ciphertext blocks to obtain decrypted data blocks; and assembling the decrypted data blocks to obtain a plaintext data message, the assembling being performed based on the respective sequence numbers associated with the plurality of ciphertext blocks.

17. The computer program product of claim 16, wherein the packaging includes, for each ciphertext block of the plurality of ciphertext blocks, the respective sequence number associated with the ciphertext block in the portable data structure in which the ciphertext block is packaged.

18. The computer program product of claim 17, wherein the method further comprises, in response to the request to decrypt the plurality of ciphertext blocks:

obtaining the distributed plurality of portable data structures from the plurality of nodes; and extracting the plurality of ciphertext blocks from the plurality of portable data structures;

wherein the decrypting decrypts the plurality of ciphertext blocks according to the block encryption mode and dependencies thereof to obtain the decrypted data blocks, the decrypted data blocks matching the plurality of plaintext blocks.

19. The computer program product of claim 16, wherein the plurality of nodes are located remote from each other.

20. The computer program product of claim 16, wherein the method further comprises redistributing one or more portable data structures of the plurality of portable data structures based on scaling the plurality of nodes to a different number of nodes.

\* \* \* \* \*